United States Patent [19]

Cady et al.

[11] 4,446,280

[45] May 1, 1984

[54] CROSSLINKING COMPOSITION CONTAINING ACTIVATED CARBOXYLIC ESTER POLYMER AND AMINE-TERMINATED TRIAZINE RESIN

[75] Inventors: Susan M. Cady, Yardley, Pa.; Werner J. Blank, Wilton; Peter J. Schirmann, Fairfield, both of Conn.

[73] Assignee: American Cyanamid Company, Stamford, Conn.

[21] Appl. No.: 377,504

[22] Filed: May 12, 1982

[51] Int. Cl.$^3$ .................... C08F 20/58; C08L 35/00
[52] U.S. Cl. ................................. 525/186; 526/304
[58] Field of Search ..................... 525/186; 526/304

[56] References Cited

U.S. PATENT DOCUMENTS 3,407,155 10/1968 Casebolt .......................... 525/186
3,422,139  1/1969 Tolet et al. ....................... 526/304

*Primary Examiner*—Allan Lieberman
*Attorney, Agent, or Firm*—Steven J. Hultquist

[57] ABSTRACT

The use of amine-terminated triazine resin as crosslinking agent in coating formulations containing activated carboxylic ester polymers provides improved coating properties.

17 Claims, No Drawings

CROSSLINKING COMPOSITION CONTAINING ACTIVATED CARBOXYLIC ESTER POLYMER AND AMINE-TERMINATED TRIAZINE RESIN

This invention relates to a crosslinking coating composition comprising a vinyl polymer containing activated carboxylic ester groups and, as crosslinking agent, an amine-terminated triazine resin. More particularly, this invention relates to such a composition wherein the vinyl polymer contains repeating units derived from an alkylacrylamidoglycolate or its alkyl ether and the amineterminated triazine resin resulting from the reaction of triazines with diamines.

Previous attempts at preparing crosslinking coating compositions were centered on using commercially available polymers and developing novel crosslinking agents for use therewith, see for example, U.S. Pat. Nos. 3,519,627 and 4,026,855.

Alternatively, prior attempts to prepare polymers useful with conventional diamines were directed to isocyanate and/or epoxide technology. However, these coatings have considerable drawbacks to their commerical use in that the ingredients are highly toxic, or are difficult to handle, or cannot be tailor-made to a sufficient degree to make a family of coatings useful for multiple purposes.

In U.S. Pat. No. 3,422,139, there is described the use of acrylamidoglycolic acid as a comonomer useful in coatings.

Although the use of activated esters in the preparation of regular copolyamides is well-known in the literature, see, for example, Ogata et al, (Polymer Journal, Vol. 6, p. 186-194; Vol. 6, p. 412-418; Vol. 7, p. 72-78; and Vol. 10, p. 499-504: J. Polymer/Science, Vol. 14, p. 783-792: and others), these compounds were copolymerized through the ester groups. There have not been provided compositions wherein the activated ester groups remain available for subsequent crosslinking.

What is needed, therefore, is a crosslinking coating composition which contains a polymer component containing activated ester groups which can be used to crosslink the coating composition and an effective crosslinking agent therefor. The provision for such a composition would satisfy a long-felt need and constitute a significant advance in the art.

In accordance with the present invention, there is provided a crosslinking coating composition comprising (1) a vinyl polymer containing from about 1 to 100 weight percent of repeating units derived from a monomer of the formula $$CH_2=C(R)-C(=O)-NH-C(OR')H-C(=O)-OR^2$$

wherein the R group is selected from hydrogen and methyl, R' is selected from alkyls of 1-6 carbon atoms, cycloalkyls of 5-6 carbon atoms and 2-hydroxyalkyls of 2-6 carbon atoms, $R^2$ is selected from alkyls of 1-6 carbon atoms, cycloalkyls of 5-6 carbon atoms, and 2-hydroxyalkyls of 2-6 carbon atoms, and the balance of repeating units from one or more copolymerizable ethylenically unsaturated comonomers and (2) an effective amount of an amine-terminated triazine resin which is a condensation product of the reaction between 2,4,6-triamino-1,3,5-triazine, 2(H,C, to $C_{18}$ aliphatic or cycloaliphatic, or phenyl) 4,6-diamino-1,3,5-triazine or their corresponding chlorides with a diamine or polyamine chosen from $C_2$ to $C_{14}$ aliphatic diamines and polyamines, $C_5$ to $C_{15}$ cycloaliphatic diamines, $C_6$ to $C_{15}$ aromatic diamines, and optionally a monofunctional amine chosen from $C_2$ to $C_6$ hydroxyalkylamine, $C_1$ to $C_{18}$ aliphatic amine, $C_4$ to $C_{18}$ ether amines, $C_5$ to $C_6$ cyclo aliphatic amines, and $C_6$ to $C_{11}$ aromatic amines. The resulting product has an average amine functionality of at least two and preferably 3 to 5. The preferred amine functionality is derived from primary aliphatic amines. On the average, the condensation product will contain 1 to 10 triazine moieties, and preferably 2 to 6 triazine moieties.

Typical, but not exclusive, diamines and polyamines are:
1,6-hexanediamine
1,12-dodecanediamine
1,2-ethyenediamine
4,7-dioxodecane-1,10-diamine diamino toluene
3, or 4-(2-aminomethyl)benzylamine
4,4'diaminodiphenyl methane
phenylenediamine
2,4-bis(p-aminobenzyl)aniline
bis(4,4'-aminocyclohexyl)methane
1,3 and 1,4 bis(aminomethyl)cyclohexane
diamino cyclohexane
diethylenetriamine
triethylene tetramine
bis hexamethylenetriamine Typical examples for monoamines are:
ethanolamine
diethanolamine
1-amino-2-propanol
3-amino-propanol
$C_1$ to $C_{18}$ alkylamines
$C_4$ to $C_{18}$ etheramines The ether amines have the general structure $R^3-O-(CH_2)_3-NH_2$ where $R^3$ is $C_1$ to $C_{15}$ alkyl.

The amine terminated triazine resins are obtained by either melt condensation of the aminotriazine compound with the amine in the presence of an acid catalyst at temperatures of 120° to 250° C. or by reaction of the chloride (such as cyanuric chloride) with the amine in the presence of an acid scavenger. Examples are given in U.S. Pat. No. 2,393,755 and in E. M. Smolin and L. Rapport, "s-Triazine and Derivatives" in "The Chemistry of Heterocyclic compounds, a series of Monographs", A. Weissberger, Editor, Interscience Publishers, Inc., New York, 1959.

The triazine resin has to have at least two primary or secondary amine functional sites to crosslink the activated ester moiety. The preferred compound has 3 or more primary or secondary amine functional sites. The primary amine functional sites are preferred over the secondary.

The amine groups of the amine-terminated triazine resin in the formulation may range from about 0.5 to 10 equivalents of the activated carboxylic ester functionality in a given polymer. The preferred range is 0.8 to 1.2 equivalents.

A preferred species of the amine-terminated triazine resin of the present invention has the formula

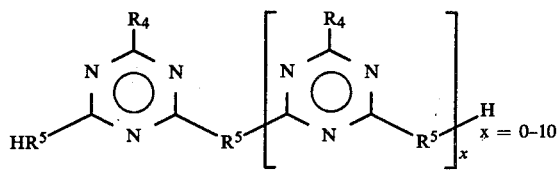

wherein $R^4$ is selected from hydrogen, $NH_2$, $R^5H$, aromatic, aliphatic of 1–18 carbon atoms, cycloaliphatic of 5–6 carbon atoms, and hydroxyalkylamine, $R^5$ is a bridging unit derived from primary diamines selected from aliphatic of 2–14 carbon atoms, cycloaliphatic of 5–15 carbon atoms, aromatic of 5–15 carbon atoms and —NH(CH$_2$)$_3$ O(CH$_2$)$_y$ O(CH$_2$)$_3$NH—, y is an integer of 2–12.

Another preferred species of amine-terminated triazine resin has the formula:

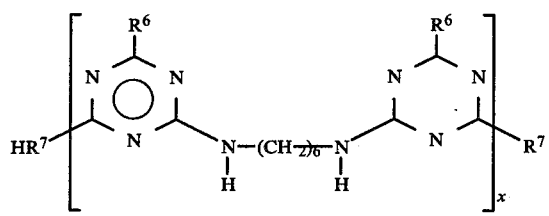

wherein $R^6$ is selected from $R^7$ and $NH_2$, and $R^7$ is —NH(CH$_2$)$_6$ NH$_2$, x is an integer of 1–3 and the ratio of triazine to hexamethylenediamine is from about 2.5 to 2:5.

The present invention also provides the crosslinked composition described above.

Aliphatic and cycloaliphatic polyfunctional amines may be used to crosslink coating formulations containing activated carboxylic ester polymers. However, when these systems are cured at ambient temperatures, migration of the amine can occur to give a coating with an oily surface or a hazy surface (most likely due to the formation of amine carbonates). Unexpectedly, we have found that inclusion of a triazine nucleus in the amine inhibits migration of the polyamine and eliminates surface problems.

In preparing the compositions of the present invention, two specific ingredients are necessary, the vinyl polymer containing activated ester groups and the amine-terminated triazine resin.

The vinyl polymer containing activated ester groups as indicated above may contain from about 1 to 100 weight percent of the monomer containing the activated ester group. Preferably, the monomer containing the activated ester group will provide from about 10 to 60 weight percent of repeating units. Any balance of repeating units may be derived from one or more copolymerizable ethylenically-unsaturated monomers. Such monomers may include, for example, alkyl acrylates and methacrylates, styrene, acrylonitrile, maleic and fumaric acids, and functional acrylates such as hydroxyethylacrylate, acrylic acid, acrylamide, etc. These polymers and copolymers are readily prepared by vinyl polymerization employing suitable free radical initiators as shown herein.

The amine-terminated triazine resin as described above is employed in the composition in effective crosslinking amounts for the polymer containing activated ester groups. The actual amounts will vary widely depending upon the nature of the cure employed, the extent of crosslinking desired, the compositions utilized, and the like. Generally, the amine groups of the amine-terminated triazine resin in the composition may range from about 0.5 to 10 equivalents based on the activated carboxylic ester functionality of the polymer employed. Preferably, about 0.8 to 1.2 equivalents of amine groups are employed.

The composition of the present invention may contain such other ingredients as are customarily employed in coating compositions. Such ingredients include, for example, polymer solvents, pigments, flow additives and modifiers, and the like, in accordance with conventional procedures.

The compositions of the present invention are useful as general purpose coatings as well as coatings in automotive, wood, decorative, textile, and paper applications. As automotive coatings, the compositions may be used as topcoat and repair coatings.

The compositions of the present invention may be cured to provide crosslinking at room or elevated temperatures. Post-curing at room temperature will generally provide improved properties over the initially obtained coatings.

The invention is more fully illustrated in the examples which follow wherein all parts and percentages are by weight unless otherwise specified.

PREPARATION OF THE POLYMERS

Polymer A

Methyl acrylamidoglycolate methyl ether, in the amount of 160 parts, is dissolved in 312 parts absolute ethanol and 342 parts toluene. To this are added 20 parts methacrylic acid, 248 parts butyl acrylate, 396 parts methyl methacrylate, 8 parts n-dodecyl mercaptan and 21 parts t-butylperoxyisobutyrate. The monomer mixture is placed in a dropping funnel and purged with nitrogen for 20 minutes. Toluene, 80 parts, is placed in a flask and heated to 85° C. The monomer mixture is added slowly to the flask over a 2-hour period. The reaction mixture is held at 83° C. for an additional 3-hour period. The resulting polymer solution is filtered hot through a preheated pressure funnel using filter aid. After cooling, the polymer is ready for use.

The polymer has the following characteristics: clear yellow color, dish solids (2 hours at 105° C.) 54.9% non-volatiles, and Brookfield viscosity (20 rpm, #2 spindle) 832 centipoises.

Polymer B

The procedure used for Polymer A is again followed except that the reactants are as follows:

| | |
|---|---|
| methyl acrylamidoglycolate methyl ether | 60 parts |
| methacrylic acid | 10 parts |
| butyl acrylate | 132 parts |
| methyl methacrylate | 206 parts |
| tertiary-butylperoxyisobutyrate | 10.6 parts |
| ethanol | 154 parts |
| toluene | 211 parts |

The resulting polymer is a clear, yellow liquid with dish solids of 53.6% non-volatile.

Polymer C

To a flask equipped with a stirrer, condenser, nitrogen inlet and thermometer are added 100 parts ethylacrylamidoglycolate ethyl ether dissolved in 252 parts toluene, 64 parts butyl acrylate, 116 parts methyl methacrylate, 7.2 parts methacrylic acid and 5.76 parts azobisisobutyrylnitrile. The solution is purged with nitrogen for 30 minutes and heated to 83° C. for 2½ hours.

The resulting polymer is a clear yellow liquid with dish solids of 49.2% non-volatiles.

Polymer D

The procedure used for Polymer A is again followed except that the reactants are as follows:

| | |
|---|---|
| mixed alkyl acrylamidoglycolate alkyl ether | 200 parts |
| acrylic acid | 20 |
| Butyl acrylate | 234 |
| methyl methacrylate | 142 |
| styrene | 204 |
| N—dodecylmercaptan | 16 |
| t-butylperoctoate | 16 |
| ethanol | 244 |
| toluene | 330 |

The mixed alkyl acrylamidoglycolate alkyl ether is a liquid composition consisting of the following: methyl acrylomidoglycolate methyl ether, butyl acrylamidoglycolate methyl ether, methyl acrylamidoglycolate butyl ether, and butyl acrylamidoglycolate butyl ether, the major portion being the methyl ester/methyl ether compound with an overall methyl/butyl ratio of about 3/1. The resulting polymer is a clear yellow liquid with dish solids of 58.3% non-volatiles.

Polymer E

The procedure used for Polymer A is again followed except that the reactants are as follows:

| | |
|---|---|
| methyl methacrylamidoglycolate methyl ether | 50 parts |
| acrylic acid | 4.8 |
| butyl acrylate | 56.4 |
| methyl methacrylate | 41.2 |
| styrene | 47.6 |
| N—dodecylmercaptan | 4.0 |
| t-butylperoctoate | 4.0 ethanol |
| 50.0 toluene | 100.0 |

The resulting polymer is a clear yellow liquid with a dish solids at 54.7% non-volatiles.

Two general types of amine-terminated triazine resins were employed in Examples I–X. Resins were prepared wherein in the general structure given above $R^4=NH_2$ or $R^5H$; $R^5=-NH(CH_2)_6NH-$, and x is 0–3. These resins are identified on the basis of their equivalent weight (based on primary amine functionality). Equivalent weights (EW) of 175, 222, 277, and 283 were obtained by varying $R^4$ and x.

The other amine-terminated triazine resins were prepared wherein $R^4=NH_2$ or $R^5H$, $R^4=-HN(CH_2)_3 O(CH_2)_2 O(CH_2)_3NH-$ and x=0–3. These resins are identified as etheramine-terminated triazine resins and by their equivalent weights (based on primary amine functionality).

EXAMPLE I

An amine-terminated triazine (EW=277) in the amount of 9.97 parts is dissolved in 25 parts ethanol. The resulting solution is blended with 50 parts of Polymer A diluted with 9.3 parts toluene and 9.3 parts ethyleneglycol ethyl ether. This mixture is cast into films on pretreated aluminum panels and baked at either 50° C., 100° C. or 120° C. for 20 minutes or cured at ambient conditions and held for 2 weeks post-cure at ambient conditions. These films have good solvent resistance and hardness as shown in Table I. The 100° C. and 120° C. cured films withstand 330 hours of 40° C. water immersion. The 50° C. and room temperature cured panels withstand 48 hours of 40° C. water immersion.

EXAMPLE II

The procedure of Example I is followed in every material detail except that 8.30 parts of the same amine-terminated triazine resin dissolved in 20.81 parts ethanol is employed instead of the amount specified in Example I. Properties are also given in Table I.

EXAMPLE III

The procedure of Example I is again followed in every material detail except that 6.65 parts of the same amine-terminated triazine resin dissolved in 16.67 parts ethanol is employed instead of the amount specified in Example I. Properties are also given in Table I.

EXAMPLE IV

Polymer B in the amount of 30 parts is mixed with 10 parts ethylene glycol ether ether, 10 parts toluene, 15.2 parts titanium dioxide and 30 parts glass shot. The mixture is shaken on a paint shaker for 30 minutes. The mixture is then filtered through flannel and allowed to sit overnight. An amine-terminated triazine resin (EW-175), 30.5 parts dissolved in 7.57 parts ethanol, is blended with the pigmented polymer solution along with 0.17 part of 10% silicone flow additive. The resulting mixture is cast into films as in Example I on iron phosphate pretreated cold rolled steel panels. Properties are also given in Table I.

The 100° C./20 minute cure panel after 2 weeks at room temperature post-cure give over 1,000 hours on the Xenon wetherometer accelerated exposure test. The room temperature and 50° C./20 minute cure panels give 300 hours on the same test. The 100° C./20 minute bake panel has 100 hours on the salt spray exposure before it failed.

EXAMPLE V

The procedure of Example IV is followed in every material detail except that the composition is as follows:

| | |
|---|---|
| 35 | parts Polymer B |
| 20 | parts titanium dioxide pigment |
| 12.3 | parts toluene |
| 12.3 | parts ethyleneglycol ethyl ether |
| 5.82 | parts amine-terminated triazine resin (EW = 277) dissolved in 8.77 parts ethanol |
| 2.5 | parts 0.1% fluorocarbon flow additive |
| 7.52 | parts 3% cellulose butyrate flow modifier |
| Properties are given in Table I. | |

All panels give more than 336 hours on water immersion testing in a 40° C. bath.

EXAMPLE VI

Amine-terminated triazine resin (EW=222) in the amount of 1.53 parts is dissolved in a mixture of 2.66 parts ethanol and 2.86 parts are ethyleneglycol ethyl ether acetate. This solution is blended with 8 parts of Polymer C. After ageing for 15 minutes, the mixture is cast into films on iron phosphate pretreated cold rolled steel and baked at either 50° C. for 20 minutes or 100° C. for 20 minutes. Properties are given in Table I.

EXAMPLE VII

The procedure of Example VII is followed in every material detail except that the amount of amine-terminated triazine resin is 1.79 parts. Properties are given in Table I.

EXAMPLE VIII

An ether amine-terminated triazine resin (EW=220) in the amount of 6.5 parts is blended with 50 parts of Polymer A and 0.04 parts of a 50% silicone flow modifier. The mixture is cast into films on pre-treated aluminum panels and baked at either 50° C. or 100° C. for 20 minutes or cured at ambient conditions and held for two weeks post-cure at ambient conditions. These panels have excellent solvent resistance and high gloss. All the panels passed 1000+ hours on a 38° C. Cleveland humidity cabinet.

EXAMPLE IX

An amine-terminated triazine resin (EW=283) in the amount of 10.9 parts is dissolved in 10.9 parts 2-ethoxyethanol. The resulting solution is added to parts of Polymer D diluted with 2 parts toluene, and 0.08 parts of a 50% solution of a silicone flow modifier is added. Panels are cast on pretreated aluminum panels and cured at ambient temperature, 50° C./20 minute and 100° C./20 minute. Results are as follows:

|  | 1 day RT post cure | | 20 day RT post cure |
|---|---|---|---|
| Cure | MEK Rubs | Knoop Hardness | Knoop Hardness |
| RT | 200 | 3.3 | 9.8 |
| 50° C. | 200 | 3.0 | 9.3 |
| 100° C. | 200 | 9. 3 | 10.7 |

EXAMPLE X

A coating prepared from an amine-terminated triazine resin in 2-ethoxyethanol, Polymer E, and a silicone flow modifier is cast on pretreated aluminum panels and cured. Results are comparable to those obtained from the acrylamide derivative.

EXAMPLE XI

A coating prepared from Polymer A, a silicone flow modifier, and an amine-terminated triazine resin prepared from 1,12-dodecane diamine is cast on pretreated aluminum panels and cured. Results are similar to triazine resins based on 1,6-hexanediamine.

EXAMPLE XII

A coating prepared from Polymer A, a silicone flow modifier, and an amine-terminated triazine resin prepared from meta-xylenediamine is cast on pretreated aluminum panels and cured. Results are similar to the triazine resins based on 1,6-hexanediamine.

EXAMPLE XIII

A coating prepared from polymer A, a silicone flow modifier, and an amine-terminated triazine resin prepared from 1,4(bis(aminomethyl) cyclohexane is cast on pretreated aluminum panels and cured. Results are similar to the triazine resins based on 1,6-hexanediamine.

EXAMPLE XIV

Polymer F

The procedure used for Polymer D is again followed cept that the mixed alkyl acrylamidoglycolate alkyl eter is a liquid composition consisting of: 2-hydroxypropyl acrylamidoglycolate, 2-hydroxypropyl ether (major component), butyl acrylamidoglycolate, 2-hydroxy propyl acrylamidoglycolate butyl ether, and butyl acrylamidoglycolate butyl ether with an overall 2-hydroxypropyl/butyl ratio of about 3/1. The resulting polymer is a clear yellow liquid.

A coating prepared from Polymer F, an amine-terminated triazine resin, and a silicone flow modifier is cast on pretreaaluminum panels and cured at elevated temperatures to obtain a cross-linked coating.

COMPARATIVE EXAMPLE A

The procedure of Example IV is followed in every material detail except that in place of the amine-terminated triazine resin, there is employed 1.18 parts metaxylene diamine. Results are given in Table II and indicate that this crosslinking agent produces less glossy films than does the amine-terminated triazine resin (Example IV).

COMPARATIVE EXAMPLE B

The procedure of Example IV is again followed in every material detail except that in place of the amine-terminated triazine resin, there is employed 1.53 parts 4,7-dioxodecamethylene-1,10-diamine. Results are given in Table II and indicate that this amine crosslinking agent produces less glossy films than does the ether amineterminated triazine resin (Example VIII).

TABLE I

| Example No. | coating Composition | Initial Cure Conditions | INITIAL | | Film Properties POST CURE AT AMBIENT CONDITIONS | | | | | | | | | 20° Gloss |
|---|---|---|---|---|---|---|---|---|---|---|---|---|---|---|
| | | | MEK[1] | Khn[2] | Days | MEK | Khn | Days | MEK | Khn | Days | MEK | Khn | Days | MEK | |
| 1 | POLYMER A ATTR(277) | RT | 50 | 2.8 | | | | | | | 7 | 160 | 11.0 | 14 | 200 | |
| | | 50° C./20 m³ | 60 | 2.8 | | | | | | | 7 | 180 | 11.0 | 14 | 200 | |
| | | 100° C./20 m | 200 | 12.4 | | | | | | | 7 | — | 13.9 | — | — | |
| | | 120° C./20 m | 200 | 12.4 | | | | | | | 7 | — | 15.4 | — | — | |
| 2 | POLYMER A ATTR(277) | RT | 40 | 2.4 | | | | | | | 7 | 170 | 12.4 | 14 | 200 | |
| | | 50°C./20 m | 176 | 3.3 | | | | | | | 7 | 175 | 10.4 | 14 | 200 | |
| | | 100° C./20 m | 150 | 12.8 | | | | | | | 7 | 200 | 14.1 | — | — | |
| | | 120° C./20 m | 200 | 12.7 | | | | | | | 7 | — | 13.7 | — | — | |

TABLE I-continued

| Example No. | coating Composition | Initial Cure Conditions | INITIAL | | POST CURE AT AMBIENT CONDITIONS | | | | | | | | | 20° Gloss |
|---|---|---|---|---|---|---|---|---|---|---|---|---|---|---|
| | | | MEK[1] | Khn[2] | Days | MEK | Khn | Days | MEK | Khn | Days | MEK | Khn | Days | MEK | |
| 3 | POLYMER A ATTR(277) | RT | 41 | 4.3 | | | | | | | 7 | 75 | 10.4 | 14 | 160 | |
| | | 50° C./20 m | 41 | 2.9 | | | | | | | 7 | 100 | 9.3 | 14 | 180 | |
| | | 100° C./20 m | 65 | 11.5 | | | | | | | 7 | 200 | 13.0 | — | — | |
| | | 120° C./20 m | 200 | 13.5 | | | | | | | 7 | — | 14.6 | — | — | |
| 4 | POLYMER B ATTR(175) | RT | 200 | 2.0 | | | | | | | 7 | — | 11.8 | — | — | 77 |
| | | 50° C./20 m | 200 | 2.3 | | | | | | | 7 | — | 11.8 | — | — | 80 |
| | | 100° C./20 m | 200 | 12.5 | | | | | | | 7 | — | 13.7 | — | — | 83 |
| 5 | POLYMER B ATTR(277) | RT | | | 1 | 34 | 9.3 | 5 | 80 | 12.1 | 7 | 166 | 14.4 | | | 42 |
| | | 50° C./20 m | | | 1 | 41 | 16.0 | 5 | 140 | 12.7 | 7 | 175 | 13.9 | | | 36 |
| | | 100° C./20 m | | | 1 | 66 | 17.4 | 5 | 175 | 16.8 | 7 | 200 | 17.4 | | | 69 |
| | | 120° C./20 m | | | 1 | 200 | 16.0 | 5 | — | 17.4 | 7 | — | 19.3 | | | 69 |
| 6 | POLYMER C ATTR(222) | 50° C./20 m | 8 | — | 1 | 50 | — | | | | | | | 15 | 200 | |
| | | 100° C./20 m | 60 | — | 1 | 200 | — | | | | | | | — | — | |
| 7 | POLYMER C ATTR(222) | 50° C./20 m | 7 | — | 1 | 63 | — | | | | | | | 15 | 200 | |
| | | 100° C./20 m | 131 | — | 1 | 200 | — | | | | | | | — | — | |

NOTES:
[1]Methyl Ethyl Ketone Resistance - Rubs to remove 50% of coating
[2]Knoop Hardness
[3]m = minutes

TABLE II

Comparison of 20° Gloss Properties

| Example No. | Amine Crosslinking Agent | Baking Temperature | 20° Gloss |
|---|---|---|---|
| IV | ATTR (EW-175) | RT | 77 |
| | | 50° C./20 m | 80 |
| | | 100° C./20 m | 83 |
| VII | EATTR(EW-220) | RT | 100+ |
| | | 50° C./20 m | 100+ |
| | | 100° C./20 m | 100+ |
| Comp. A | m-xylylenediamine | RT | 2 |
| | | 50° C./20 m | 5 |
| | | 100° C./20 m | 68 |
| Comp. B | 4,7-dioxodecamethylene-1,10-diamine | RT | 23 |
| | | 50° C./20 m | 65 |
| | | 100° C./20 m | 68 |

What is claimed is:

1. A crosslinking coating composition comprising (1) a vinyl polymer containing from about 1 to 100 weight percent of repeating units derived from a monomer of the formula

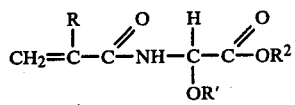

wherein the R group is selected from hydrogen and methyl, R' is selected from hydrogen, alkyls of 1-6 carbon atoms, cycloalkyls of 5-6 carbon atoms, and 2-hydroxyalkyls of 2-6 carbon atoms, and $R^2$ is selected from alkyls of 1-6 carbon atoms, cycloalkyls of 5-6 carbon atoms, and 2-hydroxy alkyls of 2-6 carbon atoms, and the balance of repeating units from one or more copolymerizable ethylenically-unsaturated comonomers and (2) as crosslinking agent an effective amount of a mixture of amine-terminated triazine resins of the average formula

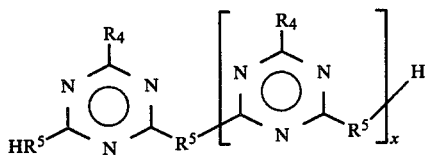

wherein $R^4$ is hydrogen, $NH_2$, $R_5H$, group an aromatic, or aliphatic group of 1-18 carbon atoms, a cycloaliphatic group of 5-6 carbon atoms, or hydroxyalkylamine, $R^5$ is individually, a bridging unit derived from primary diamines selected from aliphatic of 2-14 carbon atoms, aromatic of 6-15 carbon atoms, cycloaliphatic of 5-15 carbon atoms, or $-NH(CH_2)_3-O-(CH_2)_y-O(CH_2)_3NH-$, y is an integer of 2-12, and x is an integer of 0-10.

2. The composition of claim 1 wherein vinyl polymer contains from about 10 to 60 weight percent of said monomer containing activated carboxylic ester group.

3. The composition of claim 1 wherein said comonomer is selected from alkyl acrylates and alkyl methacrylates, styrene, acrylonitrile, maleic and fumaric acids, and functional acrylates such as hydroxyethyl acrylate, acrylic acid and acrylamide.

4. The composition of claim 1 wherein said monomer is methyl acrylamidoglycolate methyl ether.

5. The composition of claim 1 wherein said monomer is ethyl acrylamidoglycolate ethyl ether.

6. The composition of claim 1 wherein said monomer is butyl acrylamidoglycolate butyl ether.

7. The composition of claim 1 wherein said monomer is a mixture consisting of monomers wherein $R'$ and $R^2$ are the same or different and are selected from alkyls of 1 to 4 carbon atoms.

8. The composition of claim 1 wherein said amine-terminated triazine resin is selected from compounds wherein $R^5$ is $NH_2$ and $R^6H$, $R^6$ is $-NH(CH_2)_6NH-$ and $-NH(CH_2)_3O(CH_2)_2O(CH_2)_3NH-$ and x is 0–3.

9. A cross-linked coating obtained by curing the composition of claim 1.

10. The cross-linked coating of claim 9 obtained by curing at elevated temperature.

11. The crosslinked coating obtained by curing the composition of claim 4.

12. The crosslinked coating obtained by curing the composition of claim 5.

13. The crosslinked coating obtained by curing the composition of claims 4 and 8.

14. The cross-linked coating of claims 4 & 8 obtained by curing at room temperature.

15. The crosslinked coating obtained by curing the composition of claim 7.

16. The crosslinked coating obtained by curing the compositions of claims 7 and 8 at room temperature.

17. The crosslinked coating obtained by curing the compositions of claims 7 and 8 at elevated temperature.

* * * * *